US012774255B2

(12) United States Patent
Ookubo

(10) Patent No.: US 12,774,255 B2
(45) Date of Patent: Oct. 27, 2026

(54) SILICON NITRIDE SINTERED BODY, WEAR-RESISTANT MEMBER, AND METHOD FOR MANUFACTURING SILICON NITRIDE SINTERED BODY

(71) Applicants: KABUSHIKI KAISHA TOSHIBA, Tokyo (JP); TOSHIBA MATERIALS CO., LTD., Yokohama (JP)

(72) Inventor: Kazuya Ookubo, Fujisawa Kanagawa (JP)

(73) Assignee: Niterra Materials Co., Ltd., Yokohama (JP)

( * ) Notice: Subject to any disclaimer, the term of this patent is extended or adjusted under 35 U.S.C. 154(b) by 515 days.

(21) Appl. No.: 18/448,222

(22) Filed: Aug. 11, 2023

(65) Prior Publication Data

US 2023/0382809 A1 Nov. 30, 2023

Related U.S. Application Data

(63) Continuation of application No. PCT/JP2022/015006, filed on Mar. 28, 2022.

(30) Foreign Application Priority Data

Mar. 30, 2021 (JP) ................................ 2021-057052

(51) Int. Cl.
*C04B 35/593* (2006.01)
*C04B 35/645* (2006.01)
*F16C 33/32* (2006.01)

(52) U.S. Cl.
CPC ........ *C04B 35/593* (2013.01); *C04B 35/6455* (2013.01); *F16C 33/32* (2013.01);
(Continued)

(58) Field of Classification Search
CPC ................ C04B 35/593; C04B 35/584; C04B 35/6455
See application file for complete search history.

(56) References Cited

U.S. PATENT DOCUMENTS 3,833,389 A * 9/1974 Komeya .............. C04B 35/584 501/97.4
5,698,896 A * 12/1997 Komatsu .............. F16C 33/043 501/97.3
(Continued)

FOREIGN PATENT DOCUMENTS

CN 104768900 A 7/2015
CN 110590377 B * 11/2020 ............ C04B 35/64
(Continued)

OTHER PUBLICATIONS

Extended European Search Report issued Jan. 22, 2025 in related European Patent Application No. 22780744.3.
(Continued)

*Primary Examiner* — Noah S Wiese
(74) *Attorney, Agent, or Firm* — Harness, Dickey & Pierce, P.L.C.

(57) ABSTRACT

According to an embodiment, a silicon nitride sintered body includes silicon nitride crystal grains and a grain boundary phase, and in a case where Raman spectroscopy of a 20 μm×20 μm region in a central cross section of the silicon nitride sintered body is performed, two or more peaks are detected in ranges of 780 $cm^{-1}$ to 810 $cm^{-1}$ and 1340 $cm^{-1}$ to 1370 $cm^{-1}$, and four to six peaks are detected in ranges of 170 $cm^{-1}$ to 190 $cm^{-1}$, 607 $cm^{-1}$ to 627 $cm^{-1}$, 720 $cm^{-1}$ to 740 $cm^{-1}$, and 924 $cm^{-1}$ to 944 $cm^{-1}$.

17 Claims, 3 Drawing Sheets

(52) U.S. Cl.
CPC ................. *C04B 2235/3217* (2013.01); *C04B 2235/3225* (2013.01); *C04B 2235/3232* (2013.01); *C04B 2235/3826* (2013.01); *C04B 2235/3839* (2013.01); *C04B 2235/3865* (2013.01); *C04B 2235/3873* (2013.01); *C04B 2235/6562* (2013.01); *C04B 2235/6567* (2013.01); *C04B 2235/87* (2013.01); *C04B 2235/96* (2013.01)

(56) References Cited

U.S. PATENT DOCUMENTS

| | | | | |
|---|---|---|---|---|
| 7,521,388 | B2 * | 4/2009 | Komatsu ................. | F16C 33/62 501/97.3 |
| 8,377,837 | B2 * | 2/2013 | Takao ..................... | F16C 17/08 501/97.3 |
| 2007/0161493 | A1 | 7/2007 | Komatsu et al. | |
| 2011/0039068 | A1 | 2/2011 | Takao | |
| 2020/0113047 | A1 | 4/2020 | Momma et al. | |
| 2021/0261467 | A1 | 8/2021 | Funaki et al. | |

FOREIGN PATENT DOCUMENTS

| | | | | | |
|---|---|---|---|---|---|
| JP | 2003-065337 | | | 3/2003 | |
| JP | 5002155 | B2 | | 8/2012 | |
| JP | 2017075073 | A | * | 4/2017 | |
| WO | WO-2014/104112 | | | 7/2014 | |
| WO | WO-2018/194052 | | | 10/2018 | |
| WO | WO-2019235594 | A1 | * | 12/2019 | ............... H05K 1/03 |
| WO | WO-2020/121752 | | | 6/2020 | |

OTHER PUBLICATIONS

Chinese Office Action issued Oct. 31, 2024 in related Chinese Patent Application No. 202280016625.X.

* cited by examiner

SILICON NITRIDE SINTERED BODY, WEAR-RESISTANT MEMBER, AND METHOD FOR MANUFACTURING SILICON NITRIDE SINTERED BODY

CROSS-REFERENCE TO RELATED APPLICATIONS

This is a continuation application of International Patent Application PCT/JP2022/015006, filed on Mar. 28, 2022; and also claims priority to Japanese Patent Application No. 2021-057052, filed on Mar. 30, 2021; the entire contents of which are incorporated herein by reference.

FIELD

Embodiments generally relate to a silicon nitride sintered body, a wear-resistant member, and a method for manufacturing a silicon nitride sintered body.

BACKGROUND

Silicon nitride sintered bodies are used as wear-resistant members such as bearing balls, rollers, and the like by taking advantage of the wear resistance of silicon nitride sintered bodies. For example, JP 5002155 (Patent Literature 1) discusses a silicon nitride sintered body to which yttrium oxide, aluminum oxide, silicon carbide, or the like is added as a sintering aid. A silicon nitride powder discussed in Patent Literature 1 is synthesized by metal nitriding. According to this method, a silicon nitride sintered body that has high strength can be provided even when many impurities of Fe and the like exist. Wear-resistant members that include such silicon nitride sintered bodies have excellent durability.

For example, a bearing has a structure in which bearing balls are disposed between an outer ring and an inner ring. Bearing life is affected by the lives of the bearing balls, outer ring, and inner ring. In Patent Literature 1, the durability of a bearing ball made of a silicon nitride sintered body is improved. On the other hand, bearing steel (SUJ2) is used as the outer ring and inner ring. Even when the bearing ball durability is improved, the durability of the bearing degrades due to wear of the outer ring and inner ring.

In JP-A 2003-65337 (Kokai) (Patent Literature 2), a bearing ball made of a silicon nitride sintered body having a high thermal conductivity is used. The heat dissipation is improved by increasing the thermal conductivity of the silicon nitride sintered body.

DETAILED DESCRIPTION

A silicon nitride sintered body according to an embodiment includes silicon nitride crystal grains and a grain boundary phase, and in a case where Raman spectroscopy of a 20 μm×20 μm region in a central cross section of the silicon nitride sintered body is performed, two or more peaks are detected in ranges of 780 $cm^{-1}$ to 810 $cm^{-1}$ and 1340 $cm^{-1}$ to 1370 $cm^{-1}$, and four to six peaks are detected in ranges of 170 $cm^{-1}$ to 190 $cm^{-1}$, 607 $cm^{-1}$ to 627 $cm^{-1}$, 720 $cm^{-1}$ to 740 $cm^{-1}$, and 924 $cm^{-1}$ to 944 $cm^{-1}$.

Figure 1:
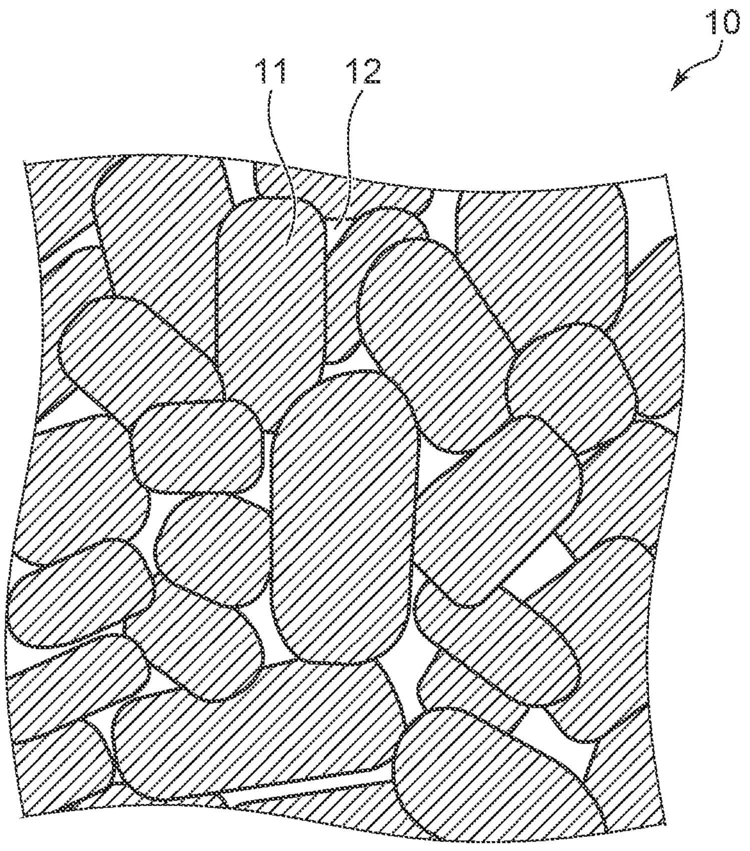
FIG. 1 is a drawing showing a portion of a cross-sectional structure of a silicon nitride sintered body according to an embodiment.

FIG. 1 is a drawing showing a portion of a cross-sectional structure of a silicon nitride sintered body according to an embodiment.

In FIG. 1, 10 is a silicon nitride sintered body, 11 is a silicon nitride crystal grain, and 12 is a grain boundary phase. As shown in FIG. 1, the silicon nitride sintered body 10 according to the embodiment includes the silicon nitride crystal grains 11 and the grain boundary phase 12. The grain boundary phase is formed by a reaction within the sintering aid powder or a reaction between the sintering aid powder and an impurity of the silicon nitride powder. The grain boundary phase fills the gaps between the silicon nitride crystal grains. The strength of the sintered body can be increased thereby.

In the invention according to the embodiment, peaks are detected in prescribed wave number ranges when the central cross section of the silicon nitride sintered body is analyzed by Raman spectroscopy (Raman spectroscopy).

Raman spectroscopy is a method of evaluating substances by using Raman scattered light. Raman scattered light is a phenomenon in which light having different wave numbers corresponding to the vibration energies for the excitation light is scattered. The wavelength difference corresponds to the amount of energy of the molecular vibration of the substance. Raman scattered light that has different wavelengths can be obtained for substances having different molecular structures. By examining the Raman scattered light, the vibrational modes of the atoms of the sample can be identified, and data related to the bonding state can be obtained. For example, even for the same composition, different Raman scattered light is obtained when the orientation, crystallinity, or the like is different.

The measurement region of the Raman spectroscopy was set to a unit area 20 μm×20 μm region in a central cross section. This size allows both the silicon nitride crystal grains and the grain boundary phase to be included in the measurement region. Also, the central cross section is a cross section passing through the center of the silicon nitride sintered body. That is, a 20 μm×20 μm region that includes the center of the silicon nitride sintered body is set as the measurement region. When the sintered body is spherical, the center of gravity is the center. When the sintered body is a rectangular parallelepiped, the intersection of the diagonals is the center. Also, a wear-resistant member can be made by performing surface polishing of the silicon nitride sintered body. The central cross section of the sintered body was set as the measurement region because the surface is removed by the polishing.

Also, the inViaReflex Ray microscope (resolution: 0.3 $cm^{-1}$) made by Renishaw plc or a device having equivalent or better performance is used as the measurement device used in the Raman spectroscopy. A LD-pumped green laser (having a wavelength of 532 nm and an output of 100 mW) was used as the excitation laser. The irradiated laser beam diameter was set to 0.7 μm. The exposure time was set to 1 second per measurement point, and the stage movement step was set to 0.4 μm. Multivariate curve resolution (MCR) using image analysis software WiRe4 Empty Modelling was used for the data analysis. Here, the peaks in the obtained Raman spectra detected by the analysis software were used as the peaks; and the peak positions and their intensities and widths at half maximum also were determined using the analysis software. The peak intensities obtained by the analysis software at that time are values obtained from the difference between the absolute values of the peaks and the baseline value. The baseline value also can be obtained by the analysis software. Also, the total number of measurement locations was 2601 locations. Spectra having an improved SN ratio (the ratio of the magnitude of the noise to the magnitude of the spectrum) was obtained by averaging the spectra at all of the measurement locations. Also, Raman spectra having little measurement location dependence were obtained by measuring while moving the stage. The air temperature when measuring was 25 degrees Celsius (25° C.). The locations measured at this time were locations distant to the surface. The appearance of the obtained sintered body was gray.

For the silicon nitride sintered body according to the embodiment, two or more peaks are detected in the ranges of 780 $cm^{-1}$ to 810 $cm^{-1}$ and 1340 $cm^{-1}$ to 1370 $cm^{-1}$. For example, one or more peaks are detected in the range of 780 $cm^{-1}$ to 810 $cm^{-1}$, and one or more peaks are detected in the range of 1340 $cm^{-1}$ to 1370 $cm^{-1}$. Two or more peaks may be detected in the range of 1340 $cm^{-1}$ to 1370 $cm^{-1}$ without detecting a peak in the range of 780 $cm^{-1}$ to 810 $cm^{-1}$. Or, two or more peaks may be detected in the range of 780 $cm^{-1}$ to 810 $cm^{-1}$ without detecting a peak in the range of 1340 $cm^{-1}$ to 1370 $cm^{-1}$.

Also, four to six peaks are detected in the ranges of 170 $cm^{-1}$ to 190 $cm^{-1}$, 607 $cm^{-1}$ to 627 $cm^{-1}$, 720 $cm^{-1}$ to 740 $cm^{-1}$, and 924 $cm^{-1}$ to 944 $cm^{-1}$. In other words, the number of peaks detected in these ranges is greater than 3 but not greater than 6. More favorably, the number of peaks is 4 or 5. For example, one or two peaks may be detected in each of the range of 170 $cm^{-1}$ to 190 $cm^{-1}$, the range of 607 $cm^{-1}$ to 627 $cm^{-1}$, the range of 720 $cm^{-1}$ to 740 $cm^{-1}$, and the range of 924 $cm^{-1}$ to 944 $cm^{-1}$. Two or more peaks may be detected in a portion of these ranges without peaks being detected in the other ranges. However, it is more favorable for one or two peaks to be detected in each wave number range of these ranges.

Too many peaks in the range suggests that a large number of molecules having different bonding strengths exist in the sintered body. That is, for example, too many peaks suggest the possibility that a large amount of impurities exist, the possibility that too many types of components are added as the aids, fluctuation of the bonding strength of molecules existing in the sintered body occurred, etc. When many types of components are added as the aids, it may be difficult to control the added amount or control the dispersibility of the aids in the mixing process or a subsequent process. When there is unevenness in the bonding strength between the molecules, unevenness also may occur in the tendency to induce wear of the mating members. It is therefore favorable for four to six peaks to be detected in the ranges of 170 $cm^{-1}$ to 190 $cm^{-1}$, 607 $cm^{-1}$ to 627 $cm^{-1}$, 720 $cm^{-1}$ to 740 $cm^{-1}$, and 924 $cm^{-1}$ to 944 $cm^{-1}$.

In the application, the notation "x to y" means "not less than x and not more than y"; and "x" and "y" are included in the range.

In the silicon nitride sintered body according to the embodiment, peaks may be detected in ranges other than those described above. Although peaks that may be observed in ranges other than those described above are not particularly limited, for example, peaks may exist in ranges such as 805 $cm^{-1}$ to 815 $cm^{-1}$, 715 $cm^{-1}$ to 725 $cm^{-1}$, 270 $cm^{-1}$ to 280 $cm^{-1}$, and 410 $cm^{-1}$ to 420 $cm^{-1}$. The peaks that are detected in the range of 270 $cm^{-1}$ to 280 $cm^{-1}$ are due to tungsten oxide. The peaks that are detected in the range of 410 $cm^{-1}$ to 420 $cm^{-1}$ are due to iron oxide.

Also, it is favorable for the peak intensities detected in the range of 515 $cm^{-1}$ to 525 $cm^{-1}$ not to be the most intense peak among the peaks detected between 400 $cm^{-1}$ and 1200 $cm^{-1}$. In other words, the intensity of at least one peak detected between 400 $cm^{-1}$ and 1200 $cm^{-1}$ is greater than the intensities of the peaks detected in the range of 515 $cm^{-1}$ to 525 $cm^{-1}$. The lower the peak intensity in the range of 515 $cm^{-1}$ to 525 $cm^{-1}$, the better. It is therefore more favorable for a peak not to exist in the range of 515 $cm^{-1}$ to 525 $cm^{-1}$. A peak in the range of 515 $cm^{-1}$ to 525 $cm^{-1}$ may be due to free Si. When free Si is present, the durability of a wear-resistant member made of the silicon nitride sintered body may be degraded.

The type of chemical bond can be determined from the position of the peak detected by Raman spectroscopy. Also, the full width at half maximum of the peak indicates the crystallinity. Hereinafter, the "full width at half maximum" is called simply the "width at half maximum". The crystallinity increases as the width at half maximum of the peak decreases. Also, the peak intensity is affected by the orientation and/or concentration. The peak shift value is affected by the stress and/or strain amount. Even for materials of the same composition, the numbers, intensities, and widths at half maximum of the peaks change according to the bonding state, crystallinity, orientation, strain amount, etc.

As described above, the detection positions of the Raman spectral peaks change according to the bonding state, crystallinity, orientation, strain amount, etc. The wear resistance of a silicon nitride sintered body having Raman spectral peaks such as those described above can be improved. Also, when the silicon nitride sintered body is used as a wear-resistant member, the tendency to induce wear of the mating members can be suppressed.

The peaks detected in the range of 780 $cm^{-1}$ to 810 $cm^{-1}$ and the peaks detected in the range of 1340 $cm^{-1}$ to 1370 $cm^{-1}$ are due to carbon or a carbide. In other words, it is favorable for the silicon nitride sintered body to include carbon or a carbide. A peak is detected in 780 $cm^{-1}$ to 810 $cm^{-1}$ or the range of 1340 $cm^{-1}$ to 1370 $cm^{-1}$ when carbon or a carbide is mixed in the raw material of the silicon nitride sintered body.

The peaks detected in the range of 170 $cm^{-1}$ to 190 $cm^{-1}$, the peaks detected in the range of 607 $cm^{-1}$ to 627 $cm^{-1}$, the peaks detected in the range of 720 $cm^{-1}$ to 740 $cm^{-1}$, and the peaks detected in the range of 924 $cm^{-1}$ to 944 $cm^{-1}$ are due to the silicon nitride crystal grains.

Also, it is favorable for a peak intensity ratio $I_1/I_2$ to be within the range of not less than 1.2 and not more than 2.0, where $I_1$ is the peak intensity of the most intense peak detected in the range of 170 $cm^{-1}$ to 190 $cm^{-1}$, and $I_2$ is the peak intensity of the most intense peak detected in the range of 780 $cm^{-1}$ to 810 $cm^{-1}$.

The largest peak among the peaks due to the silicon nitride crystal grains is detected in the range of 170 $cm^{-1}$ to 190 $cm^{-1}$. The so-called main peak of the silicon nitride crystal grains is detected in the range of 170 $cm^{-1}$ to 190 $cm^{-1}$. The most intense peak detected in the range of 780 $cm^{-1}$ to 810 $cm^{-1}$ is due to carbon or a carbide.

The peak intensity ratio $I_1/I_2$ being within the range of not less than 1.2 and not more than 2.0 indicates that a prescribed amount is present for the peak intensity of carbon or carbides with respect to the main peak of the silicon nitride crystal grains. The peak intensity is mainly affected by the orientation and/or concentration. Carbon or carbides are components that improve the strength of the silicon nitride sintered body. Also, carbon or carbides are effective as lubricants. The tendency to induce wear of the mating members can be further suppressed when the peak intensity ratio $I_1/I_2$ is not less than 1.2 and not more than 2.0.

Also, the peak intensity of the most intense peak in 607 $cm^{-1}$ to 627 $cm^{-1}$ is taken as $I_3$, the peak intensity of the most intense peak in 720 $cm^{-1}$ to 740 $cm^{-1}$ is taken as $I_4$, the peak intensity of the most intense peak in 924 $cm^{-1}$ to 944 $cm^{-1}$ is taken as $I_5$, and the peak intensity of the most intense peak of the peaks in 1340 $cm^{-1}$ to 1370 $cm^{-1}$ is taken as $I_6$. In such a case, it is favorable for the peak intensity ratio $I_1/I_3$ to be not less than 2 and not more than 20. It is favorable for the peak intensity ratio $I_1/I_4$ to be not less than 2 and not more than 20. It is favorable for the peak intensity ratio $I_1/I_5$ to be not less than 2 and not more than 20. It is favorable for the peak intensity ratio $I_1/I_6$ to be not less than 2 and not more than 20. This indicates that the peaks other than the most intense peak detected in the range of 780 $cm^{-1}$ to 810 $cm^{-1}$ are relatively small peaks. The effects due to carbon or a carbide can be obtained thereby.

Also, it is favorable for one or more peaks to be detected in at least one range among the four ranges of 170 $cm^{-1}$ to 190 $cm^{-1}$, 607 $cm^{-1}$ to 627 $cm^{-1}$, 720 $cm^{-1}$ to 740 $cm^{-1}$, and 1340 $cm^{-1}$ to 1370 $cm^{-1}$, and for the widths at half maximum of the detected peaks not to be greater than 70 $cm^{-1}$, and more favorably not to be greater than 45 $cm^{-1}$. More favorably, the widths at half maximum of the peaks are not less than 3 $cm^{-1}$ and not more than 40 $cm^{-1}$.

It is more favorable for the widths at half maximum of the peaks in the peak ranges to be as described below. The widths at half maximum of the peaks in 780 $cm^{-1}$ to 810 $cm^{-1}$ are within the range of 3 $cm^{-1}$ to 25 $cm^{-1}$. The widths at half maximum of the peaks in 607 $cm^{-1}$ to 627 $cm^{-1}$ are within the range of 3 $cm^{-1}$ to 25 $cm^{-1}$. The widths at half maximum of the peaks in 720 $cm^{-1}$ to 740 $cm^{-1}$ are within the range of 3 $cm^{-1}$ to 25 $cm^{-1}$. The widths at half maximum of the peaks in 924 $cm^{-1}$ to 944 $cm^{-1}$ are within the range of 10 $cm^{-1}$ to 40 $cm^{-1}$.

Figure 2:
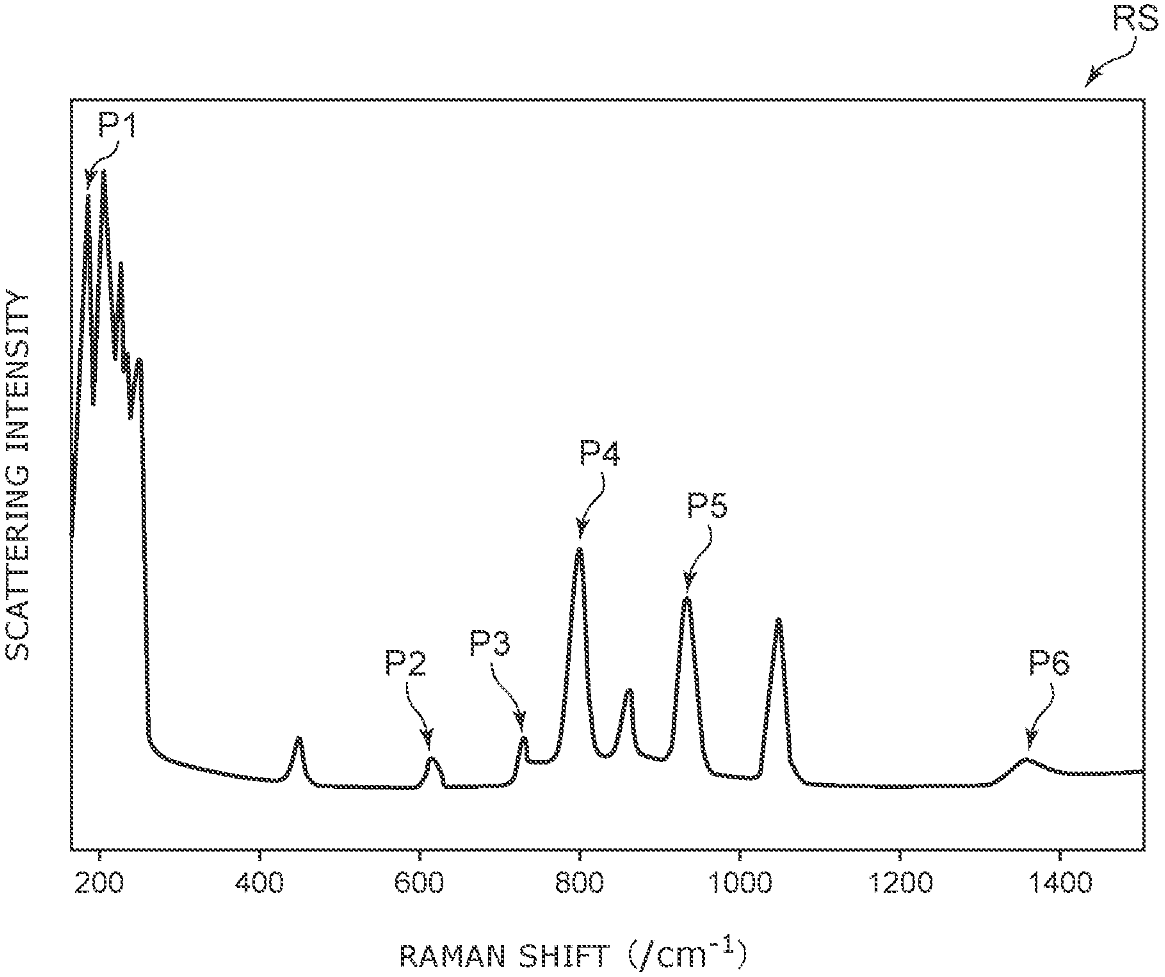
FIG. 2 is a figure schematically illustrating analysis results of Raman spectroscopy of the silicon nitride sintered body according to the embodiment.

FIG. 2 is a figure schematically illustrating analysis results of Raman spectroscopy of the silicon nitride sintered body according to the embodiment.

In the Raman spectrum RS shown in FIG. 2, the horizontal axis is the Raman shift ($cm^{-1}$), and the vertical axis is the scattering intensity. When the silicon nitride sintered body according to the embodiment is analyzed by Raman spectroscopy, for example, multiple peaks that include peaks P1 to P6 are detected as shown in FIG. 2. The peak P1 exists in the range of 170 $cm^{-1}$ to 190 $cm^{-1}$. The peak P2 exists in the range of 607 $cm^{-1}$ to 627 $cm^{-1}$. The peak P3 exists in the range of 720 $cm^{-1}$ to 740 $cm^{-1}$. The peak P4 exists in the range of 780 $cm^{-1}$ to 810 $cm^{-1}$. The peak P5 exists in the range of 924 $cm^{-1}$ to 944 $cm^{-1}$. The peak P6 exists in the range of 1340 $cm^{-1}$ to 1370 $cm^{-1}$. No peak exists in the range of 515 $cm^{-1}$ to 525 $cm^{-1}$.

Also, the peak intensity ratio $I_1/I_2$ is not less than 1.2 and not more than 2.0, where $I_1$ is the peak intensity of the peak P1 of 170 $cm^{-1}$ to 190 $cm^{-1}$, and $I_2$ is the peak intensity of the peak P4 of 780 $cm^{-1}$ to 810 $cm^{-1}$. The widths at half maximum of the peak P1 of 170 $cm^{-1}$ to 190 $cm^{-1}$, the peak P2 of 607 $cm^{-1}$ to 627 $cm^{-1}$, the peak P3 of 720 $cm^{-1}$ to 740 $cm^{-1}$, and the peak P4 of 1340 $cm^{-1}$ to 1370 $cm^{-1}$ each are not more than 45 $cm^{-1}$. No peak having a width at half maximum greater than 45 $cm^{-1}$ is detected in the ranges of 170 $cm^{-1}$ to 190 $cm^{-1}$, 607 $cm^{-1}$ to 627 $cm^{-1}$, 720 $cm^{-1}$ to 740 $cm^{-1}$, and 1340 $cm^{-1}$ to 1370 $cm^{-1}$.

It is favorable for the silicon nitride sintered body to include not less than 80 mass % of silicon nitride, not less than 2 mass % and not more than 4 mass % of a rare-earth element when converted into it's oxide, and not less than 2 mass % and not more than 6 mass % of an Al component when converted into it's oxide. Also, it is favorable for the silicon nitride sintered body to include not less than 1 mass % and not more than 7 mass % of a carbide compound. The carbide compound includes, for example, silicon carbide. More favorably, the silicon nitride sintered body includes not less than 2 mass % and not more than 7 mass % of silicon carbide.

It is more favorable for the silicon nitride sintered body to include not more than 3 mass % of at least one selected from the group consisting of Ti, Zr, Hf, W, Mo, Ta, Nb, and Cr when converted into it's oxide. When one, two, or more components selected from the group consisting of Ti, Zr, Hf, W, Mo, Ta, Nb, and Cr are included, it is more favorable for the total amount of the components to be not less than 0.5 mass % and not more than 3 mass % when converted into their oxides. More favorably, the total value of the components is not less than 0.8 mass % and not more than 2.5 mass %.

Rare-earth elements have the effect of improving the sinterability. Yttrium (Y) or a lanthanoid element is favorable as the rare-earth element. When a rare-earth element is added as a sintering aid, it is favorable to add a rare-earth oxide. Even when two or more rare-earth oxides are added, it is favorable for the total content of the rare-earth elements to be within the range of not less than 2 mass % and not more than 4 mass % when converted into their rare-earth oxides.

When an Al (aluminum) component is added as a sintering aid, one or two selected from aluminum oxide and aluminum nitride are examples of the Al components. Aluminum oxide ($Al_2O_3$) or aluminum nitride (AlN) has the effect of promoting the sintering of rare-earth oxides. Also, aluminum nitride (AlN) has the effect of preventing decomposition of the silicon nitride crystal grains. Even when both aluminum oxide and aluminum nitride are used as the Al components, it is favorable for the total Al component content to be within the range of not less than 2 mass % and not more than 10 mass % when converted into their oxides.

The rare-earth oxide and the Al component form a grain boundary phase by reacting with each other. Also, silicon carbide (SiC) can be present as particles in the grain boundary phase. The grain boundary phase can be reinforced thereby. Also, because silicon carbide also is lubricating, silicon carbide also has the effect of improving the wear resistance. Also, by mixing silicon carbide into the raw material of the silicon nitride sintered body, silicon carbide can be present inside the silicon nitride sintered body as well.

Components selected from the group consisting of Ti, Zr, Hf, W, Mo, Ta, Nb, and Cr are present in the silicon nitride sintered body as at least one selected from an oxide, a nitride, and a carbide. These components have a sintering promotion effect and a grain boundary phase reinforcing effect. Also, the effect of silicon carbide may decrease when the content of these components is greater than 3 mass %. Although not particularly limited, it is favorable for the lower limit of the total value of the content of the components selected from the group consisting of Ti, Zr, Hf, W, Mo, Ta, Nb, and Cr to be not less than 0.5 mass %.

It is favorable for the area ratio of the silicon nitride crystal grains having major diameters of not less than 2 μm in the silicon nitride sintered body to be not less than 40%. It is favorable for the area ratio of the silicon nitride crystal grains having aspect ratios of not more than 1.5 to be not less than 50%. In other words, it is favorable for many silicon nitride crystal grains to have major diameters of not less than 2 μm and aspect ratios of not more than 1.5. The orientation, strain amount, etc., can be homogenized by controlling the size of the silicon nitride crystal grains.

To measure the major diameter and aspect ratio of the silicon nitride crystal grains, a scanning electron microscope (SEM) photograph of any cross section is used. The maximum diameters of each of the silicon nitride crystal grains visible in a unit area a 20 μm×20 μm region of the SEM photograph are used as the major diameters. Also, the lengths of the line segments extending perpendicular from the centers of the major diameters are used as the minor diameters. Aspect ratio=major diameter/minor diameter is used. The area ratio of the silicon nitride crystal grains visible in the 20 μm×20 μm region and having major diameters of not less than 2 μm is determined. Similarly, the area ratio of the silicon nitride crystal grains visible in the 20 μm×20 μm region and having aspect ratios of not more than 1.5 is determined.

The major diameter and the aspect ratio are measured using a portion of the silicon nitride crystal grains visible in the SEM photograph. When the silicon nitride crystal grains overlap each other, the measurement is performed using only the portions visible in the SEM photograph. Also, the grain boundary phase may be removed by etching when the individual silicon nitride crystal grains cannot be discriminated.

A silicon nitride sintered body such as that described above can have a porosity of not more than 1%, a three-point bending strength of not less than 800 MPa, and a fracture toughness value of not less than 5.7 MPa·m$^{1/2}$.

The porosity can be measured by Archimedes' method. By setting the porosity to be not more than 1%, pores can be prevented from becoming damage starting points. Also, the three-point bending strength can be measured in accordance with JIS-R-1601 (2008). Also, the fracture toughness can be measured using Niihara's equation based on the IF method of JIS-R-1607 (2015). Also, the grades of bearing balls made of silicon nitride sintered bodies are indicated in JIS-R-1669 (2014). A silicon nitride sintered body that has a three-point bending strength of not less than 800 MPa and a fracture toughness value of not less than 5.7 MPa·m$^{1/2}$ corresponds to grade 1 or grade 2.

JIS-R-1601 (2008) corresponds to ISO 14704:2000 (MOD). JIS-R-1607 (2015) corresponds to ISO 15732:2003 (MOD). JIS-R-1669 (2014) corresponds to ISO 26602:2009 (MOD).

The wear resistance of a silicon nitride sintered body that has Raman spectral peaks such as those described above can be improved. Therefore, the durability of a wear-resistant member including the silicon nitride sintered body according to the embodiment can be improved. In particular, the tendency to induce wear of the mating members can be suppressed; therefore, the durability of the mating member also can be improved. A bearing member, roll member, compressor member, pump member, engine member, friction stir welding apparatus member, etc., are examples of such a wear-resistant member.

A bearing is a combination of bearing members made of rolling bodies and a bearing ring. The rolling bodies are spherical or roller-shaped members. The rolling body member is called a bearing ball. The spherical shape is a ball; and the roller shape is a circular column. Also, a member that uses spherical rolling bodies is called a ball bearing. A member that uses roller-shaped rolling bodies is called a roller bearing. Needle bearings, tapered roller bearings, and spherical roller bearings also are included in roller bearings. Also, the bearing ring includes an outer ring and an inner ring.

Rolling rollers, feed part rollers of electronic devices, etc., are examples of roll members. Vanes and the like are examples of compressor members or pump members. Here, a compressor is differentiated as being a device that increases the pressure; and a pump is differentiated as being a device that reduces the pressure. Cam rollers, cylinders, pistons, check balls, etc., are examples of engine members. A friction stir welding apparatus tool member or the like is an example of a friction stir welding apparatus member.

Figure 3:
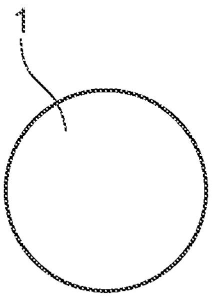
FIG. 3 is a drawing showing an example of a bearing ball according to the embodiment.
Figure 4:
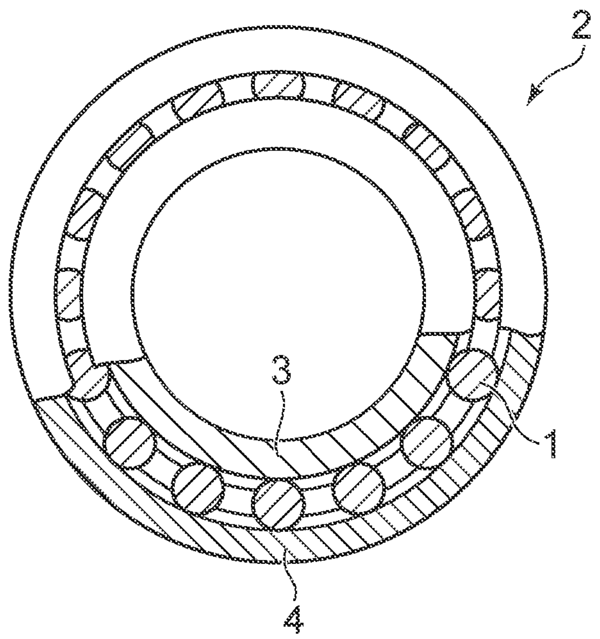
FIG. 4 is a drawing showing an example of a bearing according to the embodiment.

FIG. 3 is a drawing showing an example of the wear-resistant member (a bearing ball) according to the embodiment. FIG. 4 is a drawing showing another example of the wear-resistant member (a bearing) according to the embodiment.

In FIGS. 3 and 4, 1 is a bearing ball, 2 is a bearing, 3 is an inner ring, and 4 is an outer ring. The bearing 2 has a structure in which the bearing ball 1 is disposed between the inner ring 3 and the outer ring 4. Four or more bearing balls 1 are disposed in the bearing 2. The inner ring 3 and the outer ring 4 are mating members of the bearing ball 1.

The bearing ball 1 is made of the silicon nitride sintered body according to the embodiment. Polishing may be performed so that the surface roughness Ra is not more than 0.1 μm as necessary. The surface roughness Ra of bearing balls corresponding to the grade is defined in American Society for Testing and Materials ASTMF 2094. Therefore, the polishing may be performed to provide the surface roughness corresponding to the grade. ASTM is a standard issued by ASTM International. The former name of ASTM International is the American Society for Testing and Materials (American Society for Testing and Materials: ASTM). Also, even when applied to a wear-resistant member other than a bearing ball, surface polishing may be performed as necessary. In other words, it is favorable for the wear-resistant member according to the embodiment to include a polished surface having a surface roughness Ra of not more than 0.1 μm, or even an Ra of not more than 0.02 μm.

When the silicon nitride sintered body according to the embodiment is applied to the bearing ball 1, the durability as the bearing 2 can be improved because the tendency to induce wear of the outer ring 4 and the inner ring 3 is reduced. Multiple bearing balls 1 are used in the bearing 2. The durability as the bearing 2 can be improved by the reduction of the tendency of the individual bearing balls 1 to induce wear of the outer ring 4 and the inner ring 3.

In a bearing ball that includes the silicon nitride sintered body according to the embodiment, the crushing load can be set to be not less than 150 MPa and not more than 200 MPa. The crushing load is measured by a method in which two bearing balls are overlaid in the height direction and a load is applied from above. The load at which either one of the bearing balls is damaged is used as the crushing load.

Also, a bearing ball that includes the silicon nitride sintered body according to the embodiment can have a rolling contact fatigue life of not less than 400 hours. The rolling contact fatigue life is defined as the time until material removal of a surface of three bearing balls disposed on a raceway occurs when the bearing ball diameter is 9.525 mm (3/8 inch) and the three bearing balls are rotated while a load is applied to the bearing balls. The raceway is set in the upper surface of a plate of bearing steel SUJ and has a diameter of 40 mm. A load is applied so that a maximum contact stress of 5.9 GPa acts on the three bearing balls. The rotational speed is set to 1200 rpm. When the bearing ball diameter is not a diameter of 9.525 mm, the diameter of the bearing steel is adjusted to match the ball diameter. In other words, the diameter of the bearing steel is adjusted so that the ratio of the bearing ball diameter and the diameter of the bearing steel is 9.525:40.

By using a bearing ball such as that described above, the tendency to induce wear of the mating members can be suppressed while maintaining the durability. Therefore, the bearing 2 also has the effects of suppressing the temperature rise when rotating and suppressing the increase of the sliding noise. In recent years, inverter-driven motors are starting to become prevalent. Inverter driving is a method in which the rotational speed of the motor is variable. Generally, the rotational speed of a motor is within the range of 0 to 15000 rpm. 0 rpm is the state in which the motor is stopped. The bearings rotate according to the rotational speed of the motor. By reducing the tendency to induce wear, the durability is good even when the rotational speed is changed. Thus, the silicon nitride sintered body according to the embodiment is favorable for wear-resistant members that include mating members.

When the silicon nitride sintered body according to the embodiment is used in a flat-plate wear-resistant member, the rolling life can be not less than $1\times10^7$ revolutions. The rolling life is defined as the number of rotations of the wear-resistant member until material removal of a surface of the silicon nitrided wear-resistant member occurs when three rolling steel balls made of SUJ2 are disposed on a raceway set in the upper surface of the wear-resistant member and the rolling steel balls are rotated while applying a load. The diameter of the raceway is set to 40 mm. The diameters of the rolling steel balls each are 9.525 mm. The load applied to the rolling steel balls is 39.2 MPa. The rotational speed is set to 1200 rpm.

The shape of the wear-resistant member according to the embodiment is not limited to spherical, and various shapes are applicable. For example, cylindrical and the like are examples of shapes of the wear-resistant member other than a sphere.

Also, the bearing ball 1 according to the embodiment can reduce the tendency to induce wear of the mating members and therefore can suppress the occurrence of electrolytic corrosion. Electrolytic corrosion is a phenomenon in which a partial discharge phenomenon occurs between the bearing ball and the inner ring and between the bearing ball and the outer ring so that the surfaces of the inner ring and outer ring are eroded. The bearing includes the silicon nitride sintered body as the bearing ball and a metal such as bearing steel SUJ2 or the like as the inner ring and outer ring. When electrolytic corrosion occurs, the inner ring and the outer ring that are metal are eroded. As the erosion progresses, the function of the bearing degrades. When the function degrades, an increase of the sliding noise or the like occurs.

Generally, in a bearing, grease is filled between the bearing ball and the inner ring and between the bearing ball and the outer ring. Grease is lubricating and insulative. There are various greases such as lithium soap grease, etc. The grease is degraded when the partial discharge phenomenon occurs between the bearing ball and the inner ring and between the bearing ball and the outer ring. When degradation of the grease occurs, the lubrication and insulation degrade. Accordingly, electrolytic corrosion easily occurs. When the grease degrades, discoloration of the grease occurs. For example, lithium soap grease changes from transparent to black. For the bearing ball according to the embodiment, the degradation of the grease can be suppressed because the tendency to induce wear of the mating members is reduced. From this perspective as well, the bearing can provide a longer life.

Causes of the degradation of the grease include physical factors, chemical factors, the introduction of foreign matter, etc. Physical factors are mainly changes over time. This is degradation that occurs due to continued use. Mechanical shear, centrifugal force, etc., are examples of other physical factors. Chemical factors are mainly electrolytic corrosion. Oxidization due to heat and the like are examples of other chemical factors. Contact of the bearing ball with the inner ring or the outer ring is the major cause of introduction of foreign matter. Wear debris is generated by the bearing ball contacting the inner ring or the outer ring.

These effects cause lubrication defects, insulation degradation, etc., due to hardening of the grease.

The bearing ball according to the embodiment can suppress the tendency to induce wear of the mating members, and so the occurrence of electrolytic corrosion or wear debris can be suppressed. As a result, the degradation of the grease can be suppressed, and the bearing can have an even longer life.

A method for manufacturing the silicon nitride sintered body according to the embodiment will now be described. As long as the silicon nitride sintered body according to the embodiment has the configuration described above, the method for manufacturing the silicon nitride sintered body is not particularly limited. The following example is an example of a method for obtaining the silicon nitride sintered body with a high yield.

First, a silicon nitride powder and a sintering aid powder are prepared. It is favorable for the silicon nitride powder to have an alpha percentage of not less than 80 mass %, an oxygen content of not more than 1.5 mass %, and an average grain size of not more than 1.2 μm. Also, the silicon nitride powder may have an impurity Fe content of not less than 5 wt ppm and not more than 3500 wt ppm, an impurity Ca content of not less than 5 wt ppm and not more than 3000 wt ppm, and an impurity Mg content of not less than 1 wt ppm and not more than 1000 wt ppm. A powder that is synthesized by direct nitriding is an example of such a silicon nitride powder.

It is favorable for the average grain size of the sintering aid powder to be not more than 2 μm. The amount of the rare-earth oxide powder is set within the range of not less than 2 mass % and not more than 4 mass % when converted into it's oxide. The amount of the Al component powder is set within the range of not less than 2 mass % and not more than 10 mass %. The amount of silicon carbide is set within the range of not less than 2 mass % and 7 mass %. It is favorable to use a silicon carbide powder. Also, when at least one selected from the group consisting of Ti, Zr, Hf, W, Mo, Ta, Nb, and Cr is added as a sintering aid powder, the amount of the at least one is set within the range of not less than 0.5 mass % and not more than 3 mass % when converted into it's oxide. The added amounts of the components of the sintering aid are values when the total of the silicon nitride powder and the sintering aid powder is taken as 100 mass %.

Then, a mixing process of a raw material powder in which the silicon nitride powder and the sintering aid powder are mixed is performed. A bead mill or a ball mill is used in the mixing process of the raw material powder. Also, the mixing process is performed using a raw material powder slurry in which a binder and/or solvent are mixed.

Then, in a forming process is performed to form a formed body using the raw material powder (including the raw material powder slurry). Die pressing, cold isostatic pressing (CIP), sheet forming, etc., are applicable as the forming technique. Sheet forming is a doctor blade method, roll forming, etc. Also, these forming techniques may be combined. A solvent such as toluene, ethanol, butanol, etc., may be mixed into the raw material powder (including the raw material powder slurry) as necessary. Also, the raw material powder (including the raw material powder slurry) is mixed with an organic binder as necessary. Butyl methacrylate, polyvinyl butyral, polymethyl methacrylate, etc., are examples of the organic binder. Also, it is favorable for the added amount of the organic binder to be not less than 3 parts by mass and not more than 17 parts by mass when the raw material mixture (the total amount of the silicon nitride powder and the sintering aid powder) is taken as 100 parts by mass. When the added amount of the organic binder is less than 3 parts by mass, the binder amount is too low, and it is difficult to maintain the shape of the formed body. Also, when high, i.e., greater than 17 parts by mass, the pores in the formed body after the degreasing process (the formed body after the degreasing treatment) become large; and a dense sintered body is not obtained.

Then, a degreasing process of the formed body is performed. In the degreasing process, the formed body is heated in a nonoxidizing atmosphere at a temperature of not less than 500° C. and not more than 800° C. for not less than 1 hour and not more than 4 hours to degrease the greater part of the organic binders added beforehand. A nitrogen gas atmosphere, argon gas atmosphere, etc., are examples of the nonoxidizing atmosphere. If necessary, the organic substance amount that remains in the degreased body is controlled by processing in an oxidation atmosphere such as an ambient-air atmosphere, etc.

Then, the degreased body (the formed body after the degreasing treatment) is placed inside a firing container; and a sintering process is performed in a nonoxidizing atmosphere inside a furnace. The sintering process is performed in a nonoxidizing atmosphere, in which the temperature increase rate is set to be not less than 100° C./hour in the temperature range of not less than 1400° C. and not more than 1480° C., and the maximum sintering temperature is maintained at not less than 1700° C. and not more than 1800° C. for not less than 5 hours. A nitrogen gas atmosphere, argon gas atmosphere, etc., are examples of the nonoxidizing atmosphere of the sintering process.

It is effective to increase the temperature increase rate to be not less than 100° C./hour in the temperature range of not less than 1400° C. and not more than 1480° C. This temperature range is the temperature at which the sintering aid starts to melt and a liquid phase starts to form. This is also the temperature at which silicon nitride starts to contract due to the liquid phase formation. By increasing the temperature increase rate in this temperature range, the volatilization and decomposition of the liquid phase can be suppressed, and silicon nitride crystal grains that have an optimal crystal bonding state and crystal orientation can be made. As a result, a silicon nitride sintered body that has the desired Raman spectral peaks can be obtained. Although not particularly limited, it is favorable for the upper limit of the temperature increase rate to be not more than 500° C./hour. The burden on the furnace may be high if the temperature increase rate is too fast.

Also, it is favorable to set the temperature increase rate to be less than 100° C./hour above 1480° C. to the maximum sintering temperature. The temperature range from 1480° C. to the maximum sintering temperature is the region in which the sintered body starts to densify. By reducing the temperature increase rate in this temperature range, the degree of grain growth of the silicon nitride crystal grains can be homogenized. The grain growth affects the bonding state and orientation of the crystal. The temperature increase rate from room temperature to 1400° C. is arbitrary.

Also, it is favorable for the temperature of the sintering process to be in the range of not less than 1700° C. and not more than 1800° C. The maximum sintering temperature is set within the range of not less than 1700° C. and not more than 1800° C. When the degreased body is fired using a sintering temperature in a low-temperature state of less than 1700° C., the grain growth of the silicon nitride crystal grains is insufficient, and a dense sintered body is difficult to obtain. On the other hand, when the degreased body is fired using a sintering temperature that is greater than 1800° C., silicon nitride may decompose into Si and $N_2$ when the furnace atmosphere pressure is low. It is therefore favorable to control the sintering temperature to be within the ranges described above. Also, it is favorable for the sintering time to be within the range of not less than 3 hours and not more than 12 hours.

It is favorable to perform hot isostatic press (HIP) processing after the sintering process described above. HIP processing of the sintered body is performed in the HIP processing. The process of sintering the degreased body described above is called a first sintering process; and the process of performing HIP processing of the sintered body is called a second sintering process.

In the HIP processing, it is favorable for the temperature to be within the range of not less than 1600° C. and not more than 1800° C., and for the pressure to be within the range of not less than 80 MPa and not more than 200 MPa. The pores (the pores) inside the sintered body can be reduced by the HIP processing. A dense sintered body can be obtained thereby. When the pressure is less than 80 MPa, the effect of applying pressure is insufficient. Also, when high, i.e., greater than 200 MPa, the burden on the manufacturing apparatus may become high.

Polishing of the obtained silicon nitride sintered body is performed as necessary. Also, when multi-part manufacturing is performed, cutting and the like of the silicon nitride sintered body may be performed.

EXAMPLES

Examples 1 to 3 and Comparative Examples 1 to 2

The combinations shown in Table 1 were prepared as raw material powders. In the silicon nitride powders used in the examples and the comparative examples, the alpha percentage was not less than 80 mass %, the average grain size was not more than 1.2 μm and the impurity oxygen content was not more than 2 mass %. Also, a silicon nitride powder that was synthesized by direct nitriding was used. Therefore, in the silicon nitride powder, the impurity Fe amount was not less than 100 wt ppm and not more than 2500 wt ppm, the impurity Ca amount was not less than 10 wt ppm and not more than 1500 wt ppm, and the impurity Mg amount was not less than 3 wt ppm and not more than 1000 wt ppm. Also, a sintering aid powder that had an average grain size of not more than 2 μm was used.

TABLE 1

| | Raw material mixed powder (mass %) |
|---|---|
| Example 1 | $Si_3N_4$(89), $Y_2O_3$(2), $Al_2O_3$(2), AlN(2), SiC(3), $TiO_2$(1), $Mo_2C$(1) |
| Example 2 | $Si_3N_4$(88), $Y_2O_3$(3), $Al_2O_3$(6), SiC(2), $TiO_2$(1) |
| Example 3 | $Si_3N_4$(82.5), $Y_2O_3$(4), $Al_2O_3$(2), AlN(3), SiC(7), $TiO_2$(0.5), $Mo_2C$(1) |
| Comparative example 1 | $Si_3N_4$(89), $Y_2O_3$(2), $Al_2O_3$(2), AlN(2), SiC(3), $TiO_2$(1), $Mo_2C$(1) |
| Comparative example 2 | $Si_3N_4$(89), $Y_2O_3$(5), $Al_2O_3$(2), AlN(2), $TiO_2$(1), $Mo_2C$(1) |

The raw material powder was prepared by mixing the silicon nitride powder and the sintering aid powder in a ball mill. A raw material powder slurry was prepared by adding a binder and a solvent to the raw material powder. A formed body was made using the raw material powder slurry. Die molding was performed in the forming process. Two types of formed bodies were made, including a formed body for obtaining a bearing ball having a size of ⅜ inch (a diameter of 9.525 mm), and a formed body for measuring the flexural strength. Then, a degreasing process of the formed body was performed within the ranges of 500 to 800° C. and 1 to 4 hours.

Then, the sintering process was performed. The sintering process was performed in a nonoxidizing atmosphere at a pressure of 0.7 MPa. The temperature profile of the sintering process was set as shown in Table 2.

TABLE 2

| | Temperature increase rate from 1400° C. to 1480° C. (° C./hour) | Temperature increase rate from 1480° C. to maximum sintering temperature (° C./hour) | Maximum sintering temperature (° C.) | Holding time at maximum sintering temperature (hours) |
|---|---|---|---|---|
| Example 1 | 200 | 30 | 1700 | 10 |
| Example 2 | 100 | 50 | 1800 | 5 |
| Example 3 | 150 | 40 | 1750 | 6 |
| Comparative example 1 | 30 | 30 | 1700 | 10 |
| Comparative example 2 | 10 | 50 | 1750 | 10 |

HIP processing of the obtained sintered body was performed at 1600 to 1700° C. for 3 to 5 hours at a pressure of 100 to 200 MPa. Polishing of the sintered body after the HIP processing was performed so that the surface roughness Ra was not more than 0.02 μm. The silicon nitride sintered bodies according to the examples and the comparative examples were made by such processes.

Analysis by Raman spectroscopy was performed for the silicon nitride sintered bodies according to the examples and the comparative examples. The central cross section of the silicon nitride sintered body was used in the Raman spectroscopy. An inViaReflex Ray microscope (resolution: 0.3 $cm^{-1}$) made by Renishaw plc was used in the Raman spectroscopy. A LD-pumped green laser (having a wavelength of 532 nm and an output of 100 mW) was used as the excitation laser; the irradiated laser beam diameter was set to 0.7 μm; the exposure time was set to 1 second per measurement point; and the stage movement step was set to 0.4 μM. Multivariate curve resolution (MCR) by image analysis software WiRe4 Empty Modelling was used in the data analysis.

The results are shown in Table 3. The results indicated by "Yes" in Table 3 indicate that one peak was detected in that range.

TABLE 3

| | Existence of Raman spectral peak($cm^{-1}$) | | | | | |
|---|---|---|---|---|---|---|
| | 170~190 | 607~627 | 720~740 | 780~810 | 924~944 | 1340~1370 |
| Example 1 | Yes | Yes | Yes | Yes | Yes | Yes |
| Example 2 | Yes | Yes | Yes | Yes | Yes | Yes |
| Example 3 | Yes | Yes | Yes | Yes | Yes | Yes |
| Comparative example 1 | Yes | Yes | Yes | Yes | Yes | No |
| Comparative example 2 | Yes | No | Yes | No | Yes | No |

It can be seen from Table 3 that peaks were detected in the ranges of 170 $cm^{-1}$ to 190 $cm^{-1}$, 607 $cm^{-1}$ to 627 $cm^{-1}$, 720 $cm^{-1}$ to 740 $cm^{-1}$, 780 $cm^{-1}$ to 810 $cm^{-1}$, 924 $cm^{-1}$ to 944 $cm^{-1}$, and 1340 $cm^{-1}$ to 1370 $cm^{-1}$ for the silicon nitride sintered bodies according to the examples. In contrast, for the comparative example 1, a peak was not detected within the range of 1340 $cm^{-1}$ to 1370 $cm^{-1}$; and one peak was observed in each of the other ranges.

In this respect, it can be seen that even for similar sintering aids, different Raman spectral peaks were obtained by different manufacturing methods. In particular, for the comparative example 2, peaks were not detected in the three ranges of 607 $cm^{-1}$ to 627 $cm^{-1}$, 780 $cm^{-1}$ to 810 $cm^{-1}$, and 1340 $cm^{-1}$ to 1370 $cm^{-1}$.

No peak was detected in the range of 515 $cm^{-1}$ to 525 $cm^{-1}$ for the silicon nitride sintered bodies according to the examples.

Then, the width at half maximum and peak intensity of the Raman spectral peaks were determined. The results are shown in Tables 4 and 5.

The peak intensity of the most intense peak detected in the range of 170 $cm^{-1}$ to 190 $cm^{-1}$ was taken as h. The peak intensity of the most intense peak detected in the range of 780 $cm^{-1}$ to 810 $cm^{-1}$ was taken as $I_2$. The peak intensity of the most intense peak of 607 $cm^{-1}$ to 627 $cm^{-1}$ was taken as $I_3$. The peak intensity of the most intense peak of 720 $cm^{-1}$ to 740 $cm^{-1}$ was taken as $I_4$. The peak intensity of the most intense peak of 924 $cm^{-1}$ to 944 $cm^{-1}$ was taken as $I_5$. The peak intensity of the most intense peak of 1340 $cm^{-1}$ to 1370 $cm^{-1}$ was taken as $I_6$.

TABLE 4

| | Width at half maximum of Raman spectral peak($cm^{-1}$) | | | |
|---|---|---|---|---|
| | $I_3$ | $I_4$ | $I_2$ | $I_5$ |
| Example 1 | 19 | 17 | 20 | 32 |
| Example 2 | 11 | 8 | 16 | 25 |
| Example 3 | 22 | 21 | 23 | 38 |
| Comparative example 1 | 5 | 6 | 29 | 18 |
| Comparative example 2 | — | 5 | — | 8 |

TABLE 5

| | Peak intensity ratio of Raman spectral peak | | | |
|---|---|---|---|---|
| | $I_1/I_2$ | $I_1/I_3$ | $I_1/I_4$ | $I_1/I_5$ |
| Example 1 | 1.5 | 8 | 12 | 7 |
| Example 2 | 1.4 | 7 | 10 | 6 |
| Example 3 | 1.7 | 8 | 10 | 6 |
| Comparative example 1 | 1.1 | 23 | 5 | 5 |
| Comparative example 2 | — | — | 18 | — |

It can be seen from Tables 4 and 5 that the width at half maximum and the peak intensity ratio were within favorable ranges for the examples. In contrast, peaks of which the width at half maximum or peak intensity ratio was outside the range were detected for the comparative examples.

Then, the porosity, three-point bending strength, and fracture toughness value of the silicon nitride sintered bodies were measured. The porosity was measured by Archimedes' method. The three-point bending strength was measured in accordance with JIS-R-1601 (2008). The fracture toughness was measured using Niihara's equation based on the IF method of JIS-R-1607 (2015).

Also, the compositions of the silicon nitride sintered bodies were checked. SEM observation of arbitrary cross sections of the silicon nitride sintered bodies was performed. The area ratio (%) of the silicon nitride crystal grains visible in a 20 μm×20 μm region and having major diameters of not less than 2 μm was determined. Similarly, the area ratio (%) of the silicon nitride crystal grains visible in the 20 μm×20 μm region and having aspect ratios of not more than 1.5 were determined.

The results are shown in Table 6. In Table 6, the area ratio of the silicon nitride crystal grains having major diameters of not less than 2 μm is labeled "area ratio A (%)". The area ratio of the silicon nitride crystal grains having aspect ratios of not more than 1.5 is labeled "area ratio B (%)".

TABLE 6

| | Porosity (%) | Three-point bending strength (MPa) | Fracture toughness value ($MPa \cdot m^{1/2}$) | Area ratio A (%) | Area ratio B (%) |
|---|---|---|---|---|---|
| Example 1 | 0.1 | 850 | 6.4 | 74 | 75 |
| Example 2 | 0.2 | 800 | 6.2 | 69 | 67 |
| Example 3 | 0.1 | 910 | 6.3 | 71 | 63 |
| Comparative example 1 | 0.2 | 850 | 6.2 | 65 | 46 |
| Comparative example 2 | 0.2 | 780 | 5.6 | 47 | 42 |

Then, durability tests using the bearing balls according to the examples and the comparative examples were performed. In the durability tests, the rolling life was measured using a thrust-type rolling contact fatigue tester under the conditions of a surface pressure maximum contact pressure of 5.9 MPa and a rotational speed of 1200 rpm. Plates made of bearing steel SUJ2 were used as the mating members. The time until material removal of the surface of the bearing ball was measured. The upper limit of the measurement time was set to 400 hours. The bearing balls that had test results in which surface material removal was not confirmed even after 400 hours elapsed are indicated by "not less than 400 hours".

Also, the crushing load also measured for the bearing balls according to the examples and the comparative examples. The crushing load was measured using a method in which two bearing balls were overlaid in the height direction and a load was applied from above. The load at which either one of the bearing balls was damaged was used as the crushing load. The results are shown in Table 7.

TABLE 7

| | Durability test | Crushing load (MPa) |
|---|---|---|
| Example 1 | Not less than 400 hours | 200 |
| Example 2 | Not less than 400 hours | 180 |
| Example 3 | Not less than 400 hours | 160 |
| Comparative example 1 | Not less than 400 hours | 160 |
| Comparative example 2 | Not less than 400 hours | 150 |

It can be seen from Table 7 that the wear resistance as a bearing ball was equivalent between the examples and the comparative examples.

Then, bearings that used the bearing balls according to the examples and the comparative examples were made. The inner and outer rings were made of bearing steel SUJ2. Each bearing was assembled using sixteen bearing balls. Also, transparent lithium soap grease was used as grease. The change rate of the sliding noise of the bearing and the existence or absence of discoloration of the grease were measured.

A rotary shaft was mounted to the bearing; and the rotary shaft was rotated at 1200 rpm. To calculate the change rate of the sliding noise, the sliding noise after 10 continuous hours and the sliding noise after 300 continuous hours were measured. The change rate of the sliding noise from after 10 continuous hours until after 250 continuous hours for the comparative example 1 was taken as 1. The changes of the sliding noise of the bearings were compared to this change rate. The change rate had a value less than 1 when the change of the sliding noise was small.

Also, for the existence or absence of discoloration of the grease, the bearing was dismantled after 300 hours, and the color (the brightness) of the grease was checked.

The results are shown in Table 8.

TABLE 8

| | Sliding noise change rate | Grease color |
|---|---|---|
| Example 1 | 0.9 | Light gray |
| Example 2 | 0.8 | Light gray |
| Example 3 | 0.8 | Light gray |
| Comparative example 1 | 1 | Dark gray |

TABLE 8-continued

| | Sliding noise change rate | Grease color |
|---|---|---|
| Comparative example 2 | 1.4 | Black |

In Table 8, a brightness of not less than 9 and not more than 9.5 is defined as "light gray". A brightness of not less than 4 but less than 9 is defined as "dark gray". A brightness of less than 4 is defined as "black". The Munsell color system was used as the reference of these brightnesses. The Munsell color system corresponds to JIS Z 8721 (1993). The value of the brightness decreased as the degradation of the grease progressed.

It can be seen from Table 8 that the change rate of the sliding noise and the discoloration of the grease were improved for the examples. The color of the grease was light gray for the bearings according to the examples. The grease that was initially transparent was colored due to physical factors. Compared to the example, the coloration of the grease progressed further for the comparative examples. Although a large difference was not confirmed in the thrust test, differences were confirmed in the tests related to the change of the sliding noise and the color of the grease. This was because the contact fluctuation between the bearing ball and the mating member was reduced, and the tendency of the bearing ball to induce wear of the mating members was reduced.

While certain embodiments of the inventions have been illustrated, these embodiments have been presented by way of example only, and are not intended to limit the scope of the inventions. These novel embodiments may be embodied in a variety of other forms; and various omissions, substitutions, modifications, etc., can be made without departing from the spirit of the inventions. These embodiments and their modifications are within the scope and spirit of the inventions and are within the scope of the inventions described in the claims and their equivalents. Also, the embodiments described above can be implemented in combination with each other.

What is claimed is:

1. A silicon nitride sintered body comprising silicon nitride crystal grains and a grain boundary phase, in a case where Raman spectroscopy of a 20 μm×20 μm region in a central cross section of the silicon nitride sintered body is performed:

a total of two or more peaks being detected within combined ranges of 780 $cm^{-1}$ to 810 $cm^{-1}$ and 1340 $cm^{-1}$ to 1370 $cm^{-1}$, wherein at least one peak is detected in the range of 780 $cm^{-1}$ to 810 $cm^{-1}$;

a total of four to six peaks being detected within combined ranges of 170 $cm^{-1}$ to 190 $cm^{-1}$, 607 $cm^{-1}$ to 627 $cm^{-1}$, 720 $cm^{-1}$ to 740 $cm^{-1}$, and 924 $cm^{-1}$ to 944 $cm^{-1}$, wherein at least one peak is detected in the range of 170 $cm^{-1}$ to 190 $cm^{-1}$; and a peak intensity ratio $I_1/I_2$ being not less than 1.2 and not more than 2.0, $I_1$, being a peak intensity of a most intense peak within the range of 170 $cm^{-1}$ to 190 $cm^{-1}$, and $I_2$ being a peak intensity of a most intense peak within the range of 780 $cm^{-1}$ to 810 $cm^{-1}$.

2. The silicon nitride sintered body according to claim 1, wherein the silicon nitride sintered body includes not less than 1 mass % of a carbide compound.

3. The silicon nitride sintered body according to claim 1, wherein no peak having a full width at half maximum greater than 70 $cm^{-1}$ is detected in the ranges of 170 $cm^{-1}$ to 190 $cm^{-1}$, 607 $cm^{-1}$ to 627 $cm^{-1}$, 720 $cm^{-1}$ to 740 $cm^{-1}$, and 1340 $cm^{-1}$ to 1370 $cm^{-1}$.

4. The silicon nitride sintered body according to claim 2, wherein the carbide compound included in the silicon nitride sintered body includes silicon carbide.

5. The silicon nitride sintered body according to claim 1, wherein the silicon nitride sintered body includes:

not less than 80 mass % of silicon nitride;

not less than 2 mass % and not more than 4 mass % of a rare-earth element when converted into it's oxide;

not less than 2 mass % and not more than 10 mass % of an Al component when converted into it's oxide; and not less than 2 mass % and not more than 7 mass % of silicon carbide.

6. The silicon nitride sintered body according to claim 1, wherein the silicon nitride sintered body includes not more than 3 mass % of at least one selected from the group consisting of Ti, Zr, Hf, W, Mo, Ta, Nb, and Cr when converted into it's oxide.

7. The silicon nitride sintered body according to claim 1, wherein the silicon nitride sintered body has:

a porosity of not more than 1%;

a three-point bending strength of not less than 800 MPa; and a fracture toughness value of not less than 5.7 MPa·$m^{1/2}$.

8. The silicon nitride sintered body according to claim 4, wherein no peak having a full width at half maximum greater than 70 $cm^{-1}$ is detected in the ranges of 170 $cm^{-1}$ to 190 $cm^{-1}$, 607 $cm^{-1}$ to 627 $cm^{-1}$, 720 $cm^{-1}$ to 740 $cm^{-1}$, and 1340 $cm^{-1}$ to 1370 $cm^{-1}$.

9. The silicon nitride sintered body according to claim 8, wherein the silicon nitride sintered body includes:

not less than 80 mass % of silicon nitride;

not less than 2 mass % and not more than 4 mass % of a rare-earth element when converted into it's oxide;

not less than 2 mass % and not more than 10 mass % of an Al component when converted into it's oxide; and not less than 2 mass % and not more than 7 mass % of silicon carbide.

10. The silicon nitride sintered body according to claim 9, wherein the silicon nitride sintered body includes not more than 3 mass % of at least one selected from the group consisting of Ti, Zr, Hf, W, Mo, Ta, Nb, and Cr when converted into it's oxide.

11. A wear-resistant member comprising the silicon nitride sintered body according to claim 1.

12. The wear-resistant member according to claim 11, wherein the wear-resistant member is a bearing ball.

13. The wear-resistant member according to claim 11, wherein a crushing load of the bearing ball is not less than 150 MPa and not more than 200 MPa.

14. The wear-resistant member according to claim 11, wherein a rolling contact fatigue life, defined as a time until material removal of a surface of any of three of the bearing balls occurs, is not less than 400 hours when the three bearing balls have diameters of 9.525 mm (⅜ inch), a raceway having a diameter of 40 mm is set in an upper surface of a plate of bearing steel SUJ, the three bearing balls are disposed in the raceway, and the three bearing balls are rotated at a rotational speed of 1200 rpm while a load is applied so that a maximum contact stress of 5.9 GPa acts on the three bearing balls.

15. A method for manufacturing the silicon nitride sintered body according to claim 1, the method comprising:

a sintering process performed in a nonoxidizing atmosphere, the sintering process including a temperature increase rate set to be not less than 100° C./hour in a temperature range of not less than 1400° C. and not more than 1480° C., and a maximum sintering temperature of not less than 1700° C. and not more than 1800° C. maintained for not less than 5 hours.

16. The method for manufacturing the silicon nitride sintered body according to claim 15, wherein the sintering process includes a temperature increase rate set to be less than 100° C./hour from 1480° C. to the maximum sintering temperature.

17. The method for manufacturing the silicon nitride sintered body according to claim 15, wherein hot isostatic pressing is performed on a sintered body obtained by the sintering process.

* * * * *